(12) United States Patent
Cheou et al.

(10) Patent No.: US 7,995,274 B1
(45) Date of Patent: Aug. 9, 2011

(54) ELECTRIC PROJECTOR SCREEN

(75) Inventors: Hao-Ting Cheou, Tainan County (TW); Yao-Ching Huang, Tainan County (TW)

(73) Assignee: OMA Automation Enterprise Co., Ltd., Tainan County (TW)

( * ) Notice: Subject to any disclaimer, the term of this patent is extended or adjusted under 35 U.S.C. 154(b) by 0 days.

(21) Appl. No.: 12/842,258

(22) Filed: Jul. 23, 2010

(51) Int. Cl.
*G03B 21/56* (2006.01)

(52) U.S. Cl. ........................................ 359/461; 160/309

(58) Field of Classification Search .................. 359/443, 359/461; 160/26, 238, 309
See application file for complete search history.

(56) References Cited

U.S. PATENT DOCUMENTS

| 4,072,404 A | * | 2/1978 | Brown | 359/461 |
| 5,464,052 A | * | 11/1995 | Wieczorek et al. | 160/23.1 |
| 6,873,461 B1 | * | 3/2005 | McPherson, Jr. | 359/461 |
| 7,830,600 B2 | * | 11/2010 | Jiang | 359/461 |
| 2009/0318258 A1 | * | 12/2009 | Yang | 359/461 |

\* cited by examiner

*Primary Examiner* — Christopher Mahoney
(74) *Attorney, Agent, or Firm* — Rosenberg, Klein & Lee

(57) ABSTRACT

An electric projector screen is revealed. A linkage member is sleeved in a winding tube in a fixed seat and a locator is fixed on the winding tube. An interlock pipe mounted with a connection part therein is arranged between the linkage member and the locator. The interlock pipe and the connection part are corresponding to each other for location. An output end of a motor in the interlock pipe is connected to the connection part while the other end of the motor is arranged with a fastening plate. The cover has limit holes corresponding to the locator so that the locator is pressed tightly by stoppers passing through the limit holes. Thus the screen fabric is located and limited during motor maintenance and replacement and damages caused by sudden opening of the screen fabric are prevented. The motor maintenance and replacement become easier and more convenient.

8 Claims, 9 Drawing Sheets

ELECTRIC PROJECTOR SCREEN

BACKGROUND OF THE INVENTION

1. Fields of the Invention

The present invention relates to an electric projector screen, especially to a large-size electric projector screen in which a screen fabric is closed and opened by a motor. During the maintenance and replacement of the motor, the screen fabric is located and limited so that damages caused by quickly and vertically opening of the screen fabric due to the gravity are prevented. Moreover, the cleaning, repairing and the replacement of the motor are easier and more convenient. In use, the practical value of the electric projector screen is improved.

2. Descriptions of Related Art

Nowadays, projectors become essential equipment in a lot of large-scale emporiums and conference halls for projecting data and images of various films and video works on a screen fabric of an electric projector screen. The electric projector screen 2 is shown by an explosive view showing structure of an electric projector screen 2 available now in FIG. 7 and an assembled cross sectional view in FIG. 8.

Refer to FIG. 7 and FIG. 8, a fixed seat 21 is mounted with a winding tube 22 therein. A screen fabric 221 is wound around the winding tube 22. A linkage member 23 is fixed and sleeved in the winding tube 22 and a sleeve hole 231 is set at a middle part of the linkage member 23. A locator 24 having an insertion hole 241 on a middle part thereof is fixed at one end of the winding tube 22. A motor 25 is arranged between the linkage member 3 and the locator 24. An output end 251 of the motor 25 is mounted and connected with the sleeve hole 231 of the linkage member 23 while a fixed end 252 of the motor 25 penetrates the insertion hole 241 of the locator 24 so that the motor 25 is fixed on a center of the winding tube 22 by the locator 24. Moreover, a cover is covered on one end of the fixed seat 21. The fixed end 252 of the motor is further connected to and fixed by a fixing hole 261 of the cover 26.

Thereby, the linkage member 23 is rotated and driven by the output end 251 of the motor 25 assembled and connected with. Thus the screen fabric 221 is rolled up/down by the winding tube 22 moved along with the rotation of the linkage member 23. When the motor 25 needs to be cleaned, repaired or replaced, refer to FIG. 9, the cover 26 is disassembled and the motor 25 is removed from the winding tube 22 for maintenance and replacement.

However, the electric projector screen in which the screen fabric is opened/closed by the motor still have some problems in use while the motor is removed for maintenance and replacement. In practice, the output end of the motor is not locked and connected with the linkage member once the motor is removed. Thus the linkage member is not located by the motor that is not rotating and the screen fabric is pulled down quickly due to a certain weight of the screen fabric. This leads to damages of the screen fabric. For motor maintenance and replacement, the projector screen also needs to be disassembled and this causes inconvenience. Thus there is a need to improve the structure of the electric projector screen available now.

SUMMARY OF THE INVENTION

Therefore it is a primary object of the present invention to provide an electric projector screen in which a screen fabric is located and limited during cleaning, repairing and replacement of the motor so that damages caused by sudden and vertical opening of the screen fabric due to the gravity can be avoided. Moreover, the cleaning, repairing and replacement of the motor become easier and more convenient and the practical value of the electric projector screen is improved.

In order to achieve above object, an electric projector screen of the present invention includes a fixed seat mounted with a winding tube therein. A screen fabric is wound around the winding tube and a linkage member is fixed and sleeved in the winding tube. A locator is fixed on and connected to one end of the winding tube while an interlock pipe is arranged between the linkage member and the locator. A serrated teeth part is formed on an inner surface of the interlock pipe while a connection part having a serrated teeth part corresponding to and assembled with the serrated teeth part of the interlock pipe is mounted in the interlock pipe. A motor is mounted in the interlock pipe and an output end of the motor is connected to and fixed by the connection part 16. The other end of the motor that extends out of the locator is disposed with a fastening plate. One end of the fixed seat is covered by a cover with an insertion hole located at a center thereof, corresponding to the motor so as to fix the fastening plate of the motor outside the cover. Moreover, the cover is arranged with a plurality of limit holes corresponding to the locator. A plurality of stoppers passing through each limit holes and pressing against the locator tightly, the locator is locked up.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
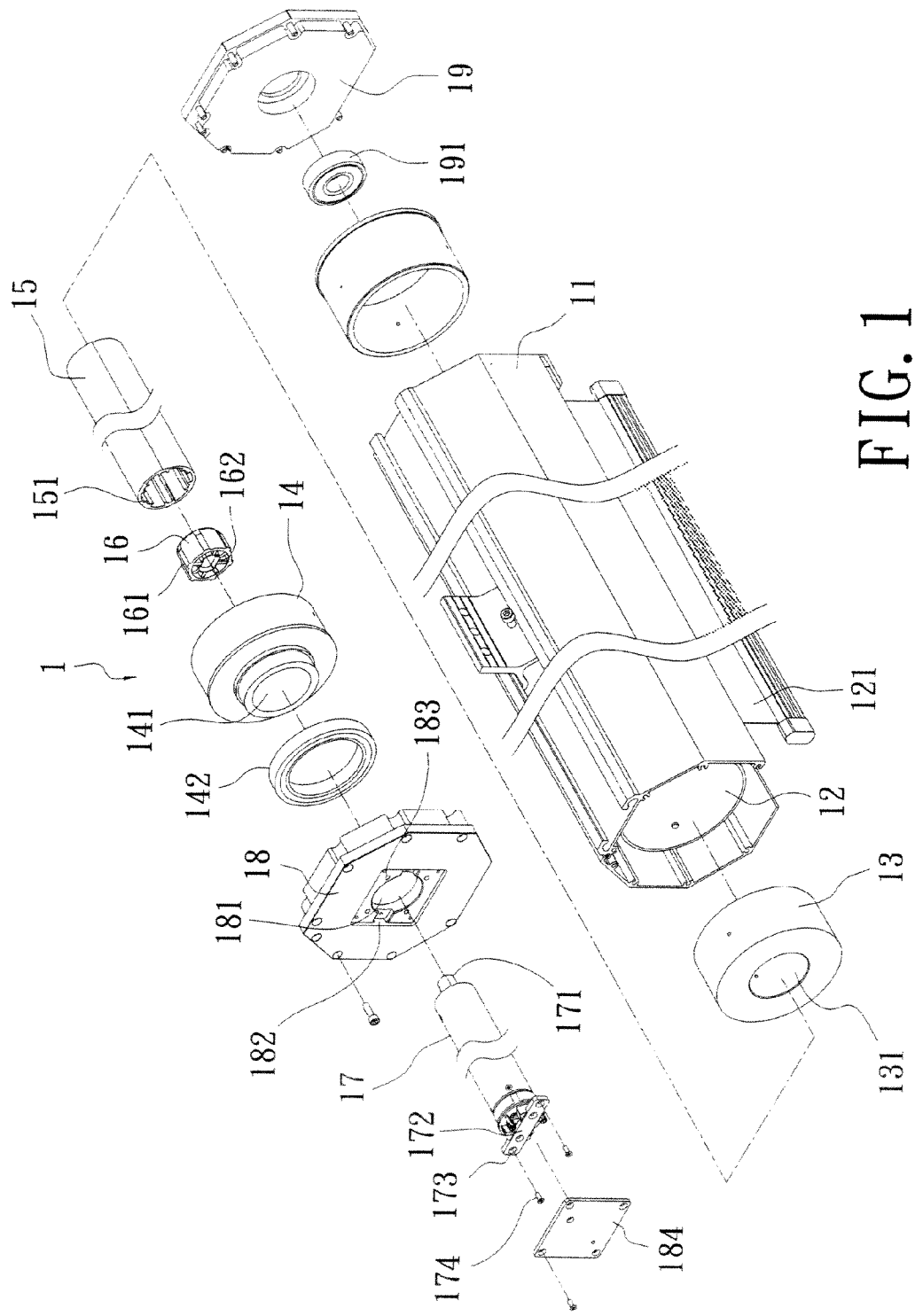
FIG. 1 is an explosive view of an embodiment according to the present invention.
Figure 2:
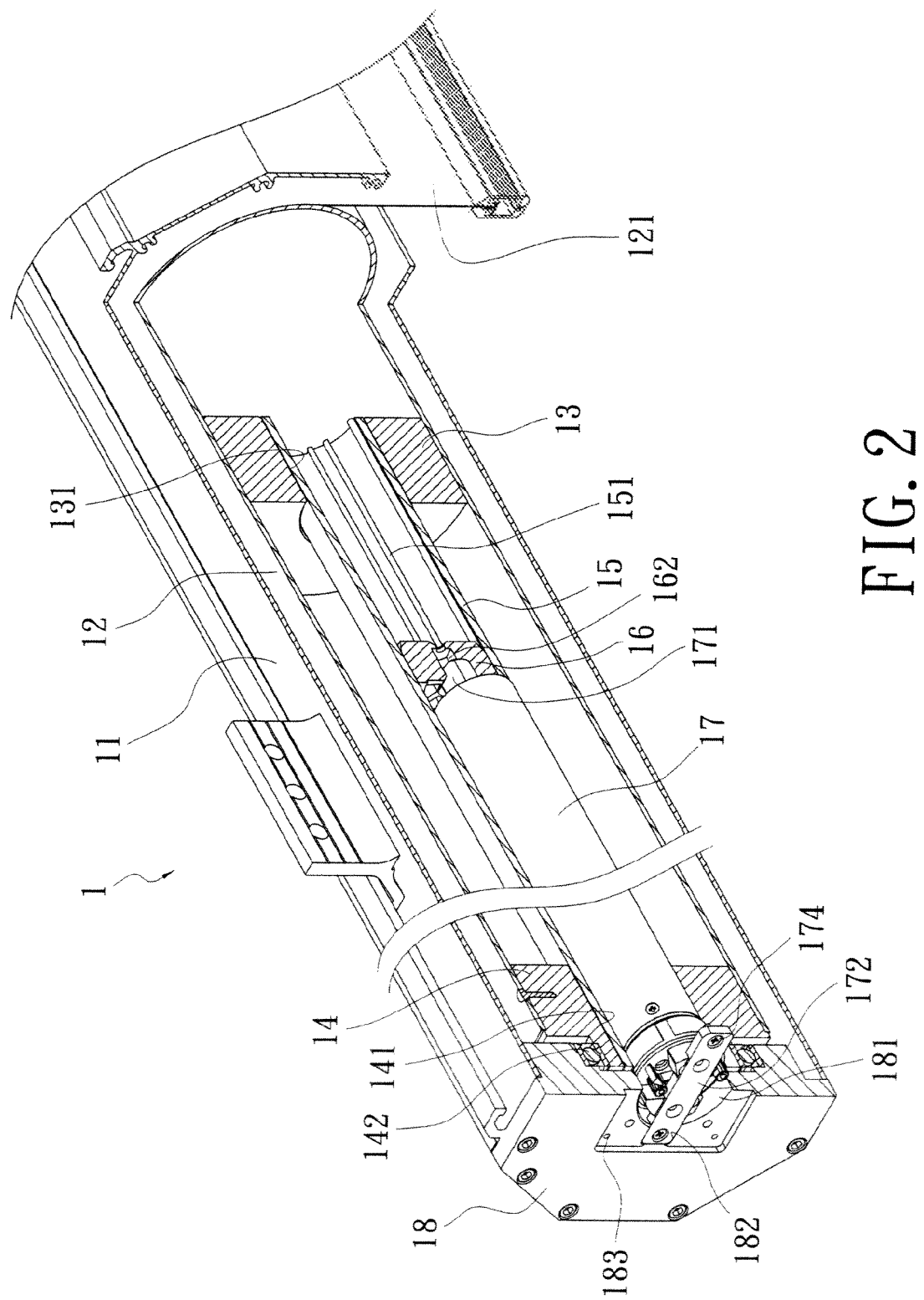
FIG. 2 is a perspective cross sectional view of an assembled embodiment according to the present invention.
Figure 3:
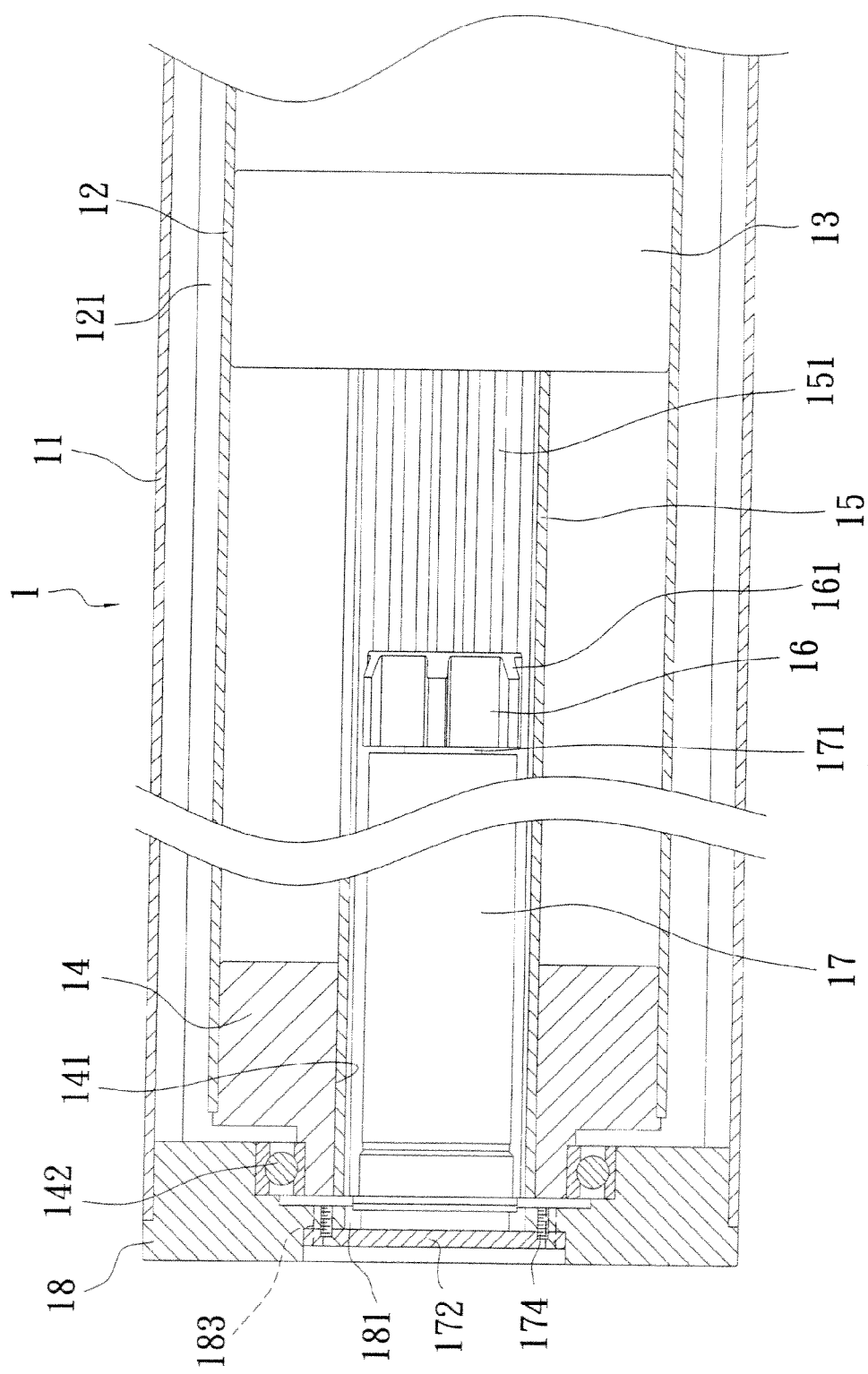
FIG. 3 is an assembled cross sectional view of an embodiment according to the present invention.

Refer from FIG. 1 to FIG. 3, an electric projector screen 1 of the present invention includes a fixed seat 11 mounted with a winding tube 12 therein. A screen fabric 121 is wound around an outer surface of the winding tube 12 and a linkage member 13 with an assembly hole 131 on a middle part thereof is sleeved and fixed in the winding tube 12. A locator 14 is fixed and sleeved on one end of the winding tube 12 while the locator 14 also having an assembly hole 141 on a middle part thereof. A bearing 142 is sleeved on the assembly hole 141. An interlock pipe 15 is arranged and fixed between the two assembly holes 131, 141. A serrated teeth part 151 is formed on an inner surface of the interlock pipe 15 while a connection part 16 is mounted in the interlock pipe 15 and is having a serrated teeth part 161 on an outer surface. The serrated teeth part 161 is corresponding to and assembled with the serrated teeth part 151 of the interlock pipe 15. The connection part 16 is further arranged with a sleeve hole 162. A motor 17 is mounted in the interlock pipe 15 while an output end 171 of the motor 17 is connected with and fixed by the sleeve hole 162 of the connection part 16. The other end of the motor 17 that extends out of the assembly hole 141 of the locator 14 is disposed with a fastening plate 172. The fastening plate 172 is arranged with at least one mounting hole 173 for being threaded and fastened by at least one fastener 174. One end of the fixed seat 11 corresponding to the motor 17 is covered by a cover 18. The cover 18 is mounted with an insertion hole 181 located at a center thereof, corresponding to the motor 17. An assembled slot 182 corresponding to the fastening plate 172 of the motor 17 is disposed concavely on the cover 18, around the insertion hole 181. Thus the fastening plate 172 of the motor 17 is threaded and fixed inside the assembled slot 182 of the cover 18 by the fastener 174 penetrating the mounting hole 173. Moreover, corresponding to the locator 14, the cover 18 is arranged with a plurality of limit holes 183. A cover plate 184 is used to cover the insertion hole 181 while the other end of the fixed seat 11 is also covered by a cover 19. A bearing 191 is disposed between the cover 19 and the winding tube 12 in the fixed seat 11. Thus the weight of the screen fabric 121 is shared by the bearing 142 and the bearing 191 on two ends of the winding tube 12 in the fixed seat 11 and corresponding to each other. Therefore, the motor load is reduced.

Figure 4:
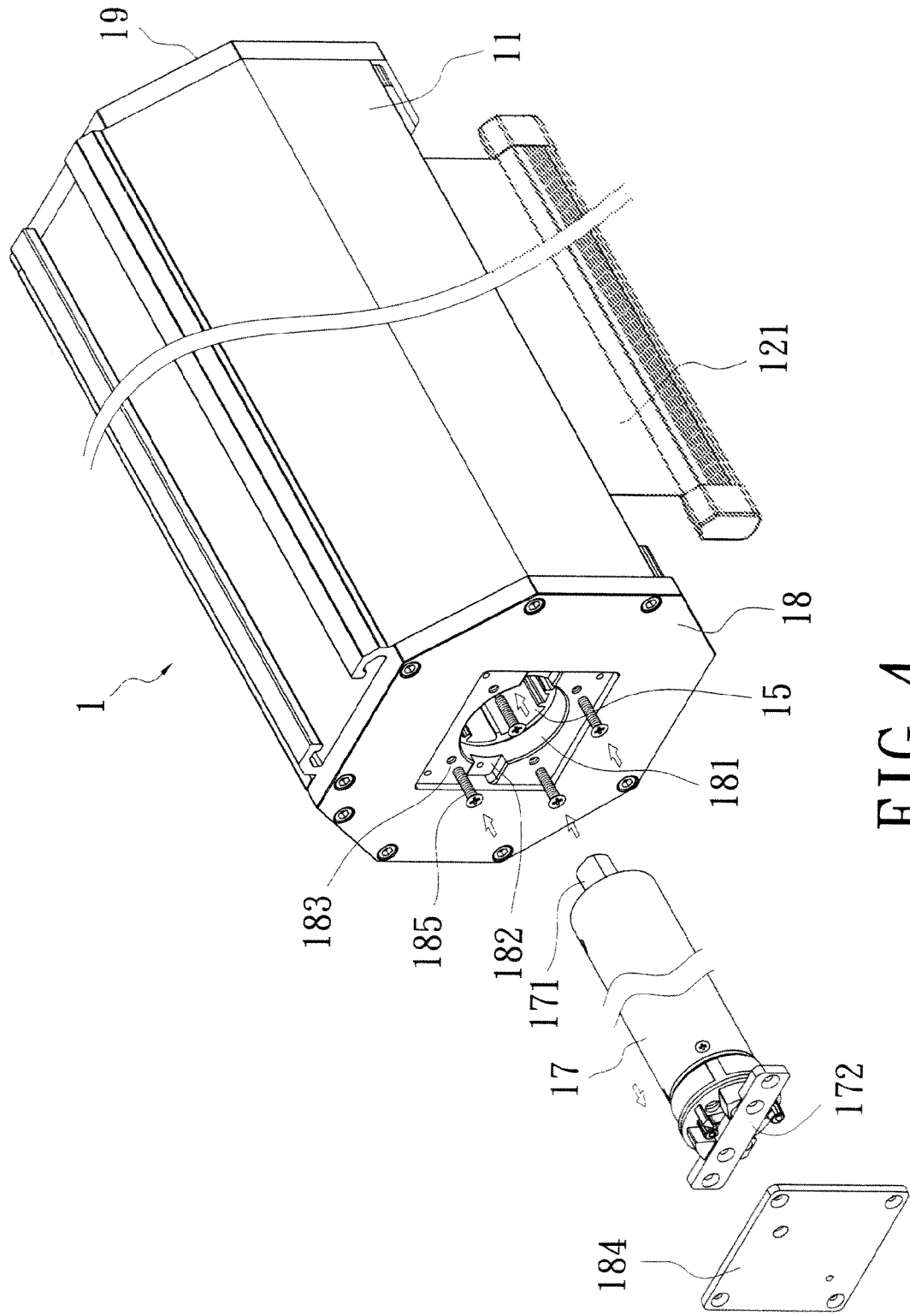
FIG. 4 is a perspective view showing an embodiment in a detached state for motor maintenance according to the present invention.
Figure 5:
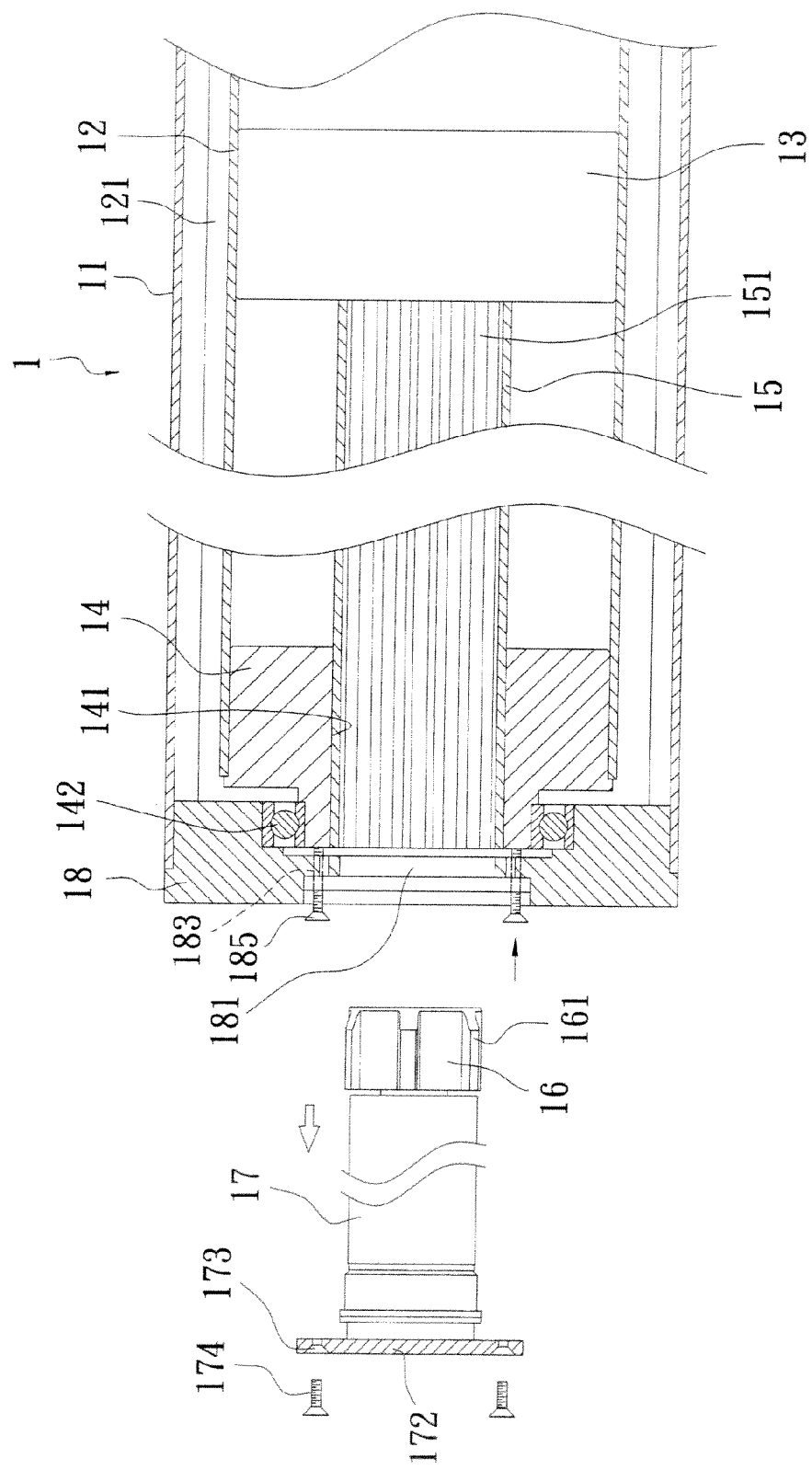
FIG. 5 is a cross sectional view showing an embodiment in a detached state for motor maintenance according to the present invention.
Figure 6:
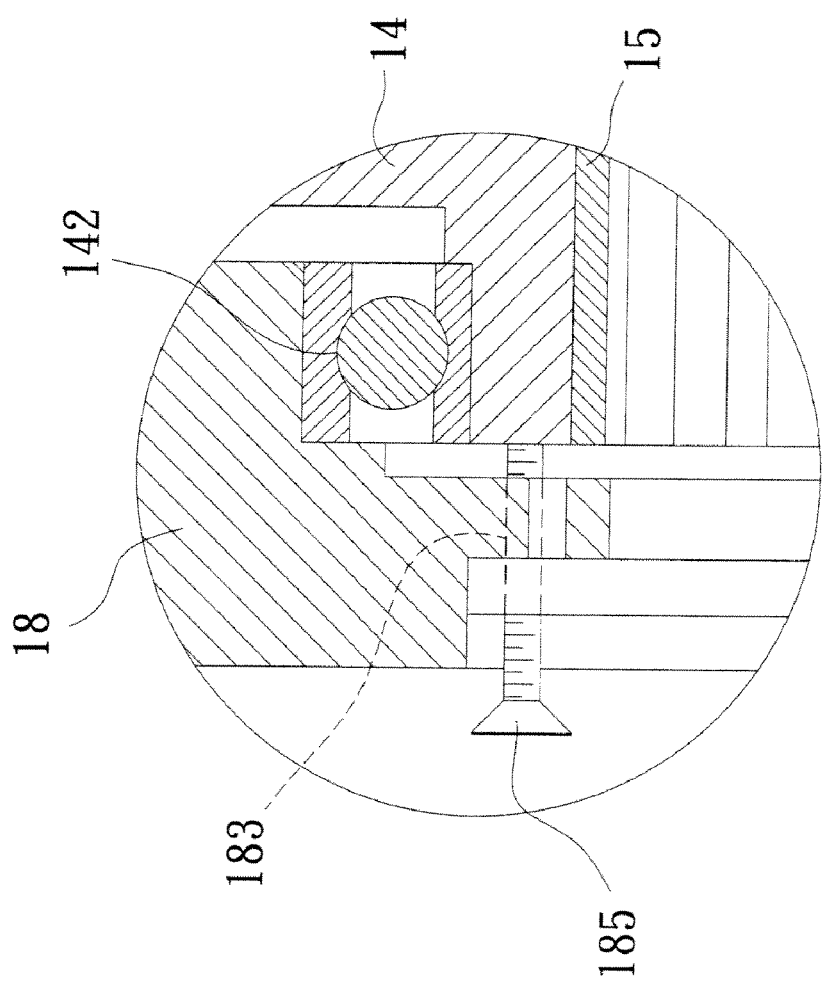
FIG. 6 is a partial enlarged view of the embodiment in a detached state for motor maintenance according to the present invention.
Figure 7:
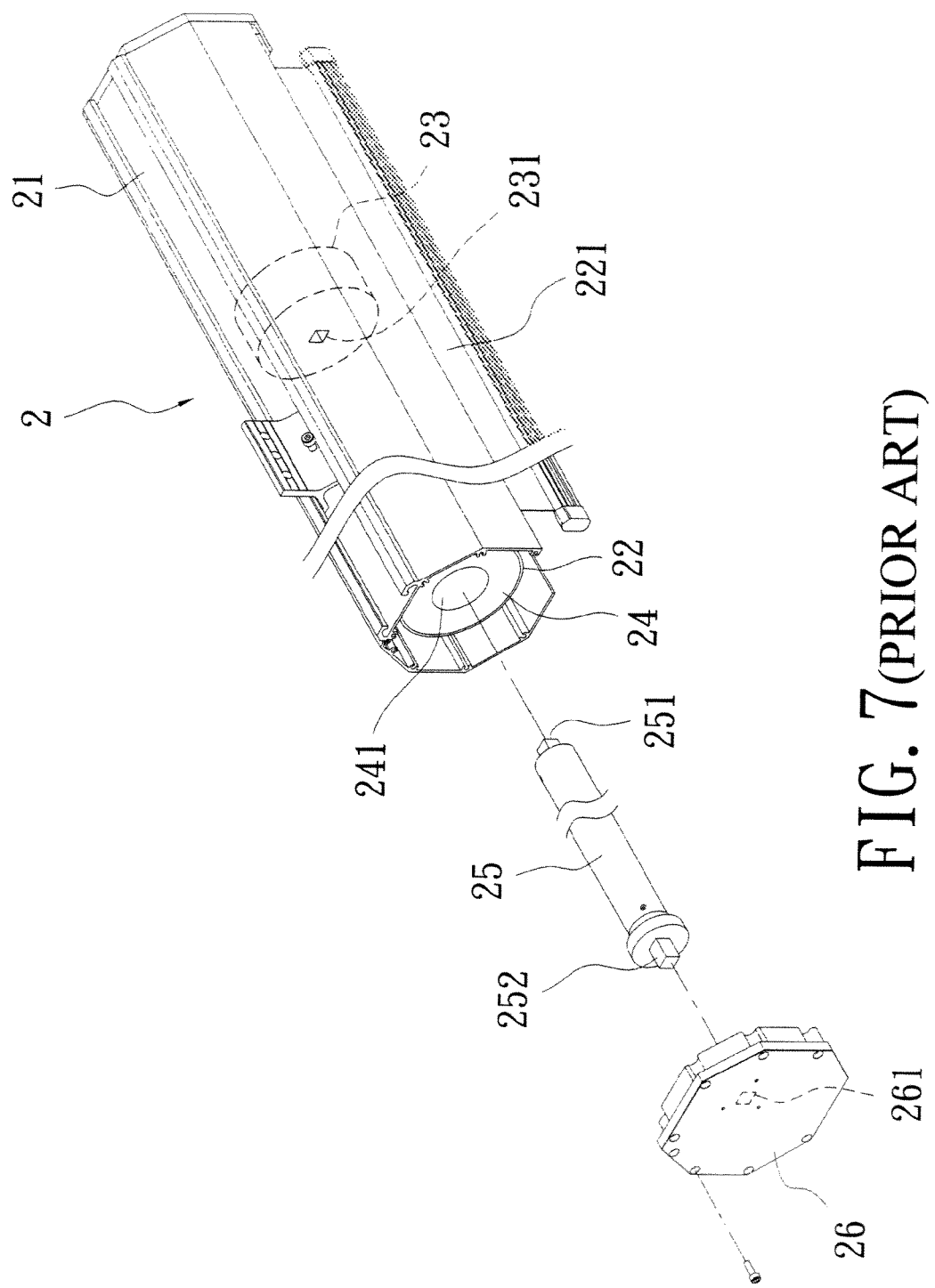
FIG. 7 is an explosive view of a prior art.
Figure 8:
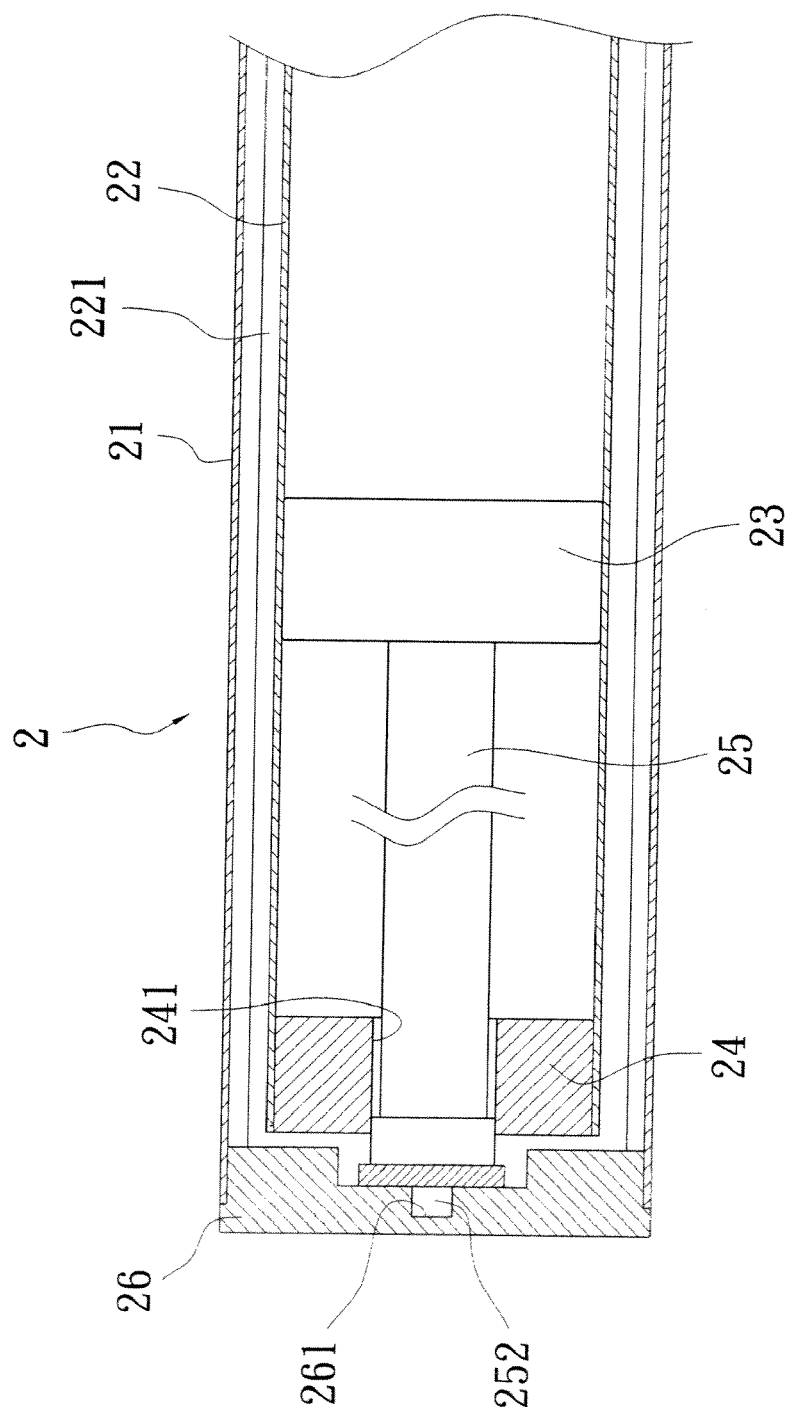
FIG. 8 is an assembled cross sectional view of a prior art.
Figure 9:
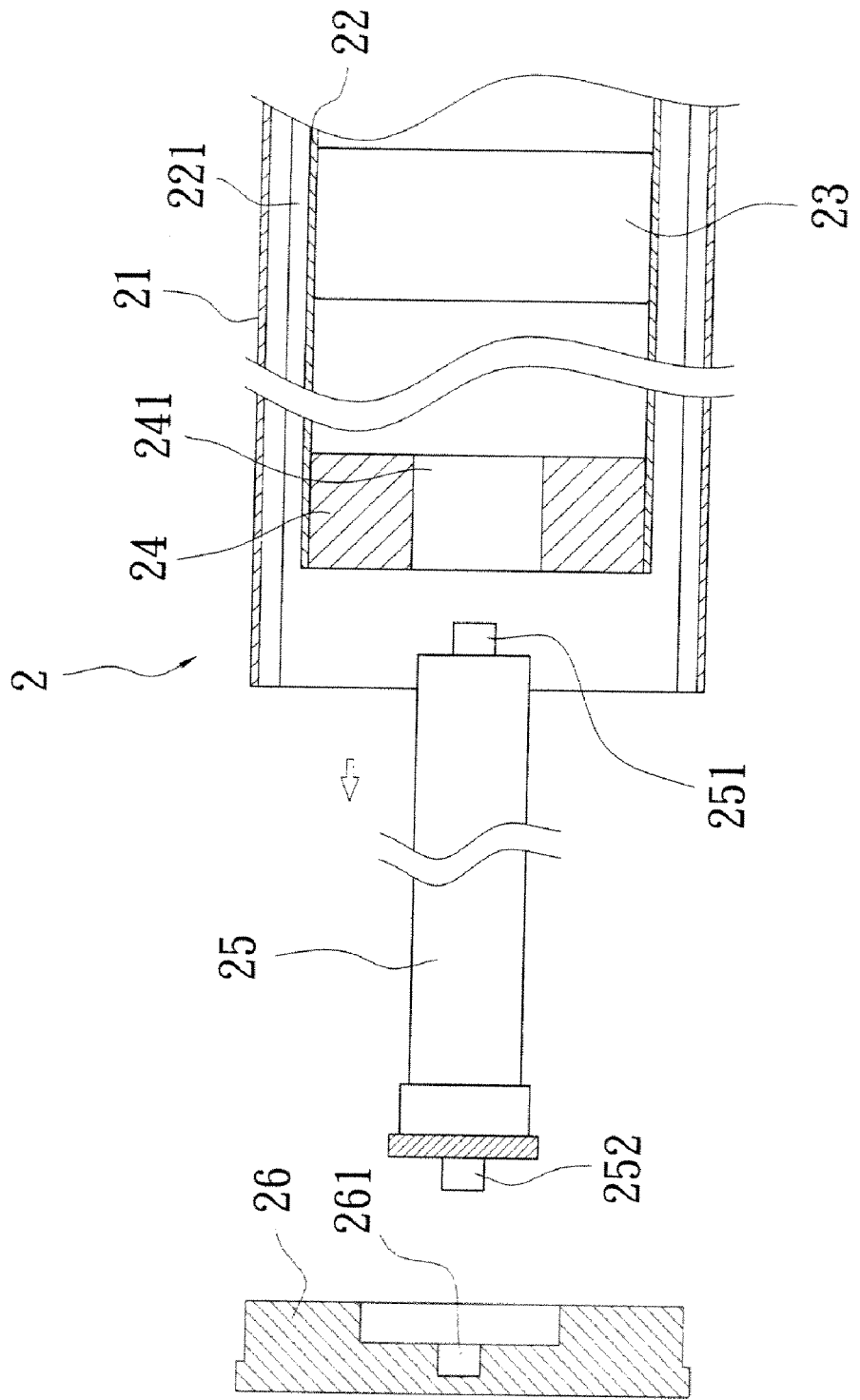
FIG. 9 is a cross sectional view showing a prior art in a detached state for motor maintenance.

Refer from FIG. 4 to FIG. 6, for motor maintenance and replacement, stoppers 185 passing through the limit holes 183 corresponding to the locator 14 on the cover 18 press inward and against the locator 14 tightly so that the locator 14 is locked up and will not rotate. Now the motor 17 is pulled outward from the insertion hole 181 of the cover 18 to be maintained, repaired or replaced. The locator 14 is pressed, held firmly by the stoppers 185 and unable to rotate, so are the interlock pipe 15, the linkage member 13 assembled and fixed on the other end of the interlock pipe 15, and the winding tube 12 sleeved and fixed around the linkage member 13 and the locator 14. Thus the screen fabric 121 wound around the winding tube 12 will not be dropped down quickly due to gravity.

In summary, the electric projector screen of the present invention is located and limited during cleaning, repairing and changing processes of the motor. Thus damages caused by quick and vertical falling of the screen fabric due to the gravity force can be avoided. The motor maintenance and replacement are easier and more convenient.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electric projector screen comprising:
a fixed seat;
a winding tube for winding a screen fabric mounted in the fixed seat;
a linkage member sleeved and fixed in the winding tube;
a locator connected to and fixed on one end of the winding tube;
an interlock pipe connected and assembled between the linkage member and the locator;
a serrated teeth part that is formed on an inner surface of the interlock pipe;
a connection part mounted in the interlock pipe and having a serrated teeth part on an outer surface thereof and the serrated teeth part is corresponding to and assembled with the serrated teeth part of the interlock pipe;
a motor mounted in the interlock pipe; an output end of the motor connected to and fixed on the connection part while the other end of the motor extending the locator and arranged with a fastening plate;
a cover set on one end of the fixed seat that is corresponding to the motor;
an insertion hole mounted on a middle part of the cover and corresponding to the motor so as to fix the fastening plate of the motor outside the cover;
a plurality of limit holes disposed on the cover, corresponding to the locator; the locator is located by stoppers passing through the limit holes and pressing against the locator firmly.

2. The device as claimed in claim 1, wherein the linkage member is arranged with an assembly hole on a middle part thereof so as to connect to and assemble with the interlock pipe.

3. The device as claimed in claim 1, wherein the locator is disposed with an assembly hole on a middle part thereof for being connected to and assembled with the interlock pipe.

4. The device as claimed in claim 3, wherein a bearing is sleeved on the assembly hole of the locator.

5. The device as claimed in claim 1, wherein the connection part is mounted with a sleeve hole and the sleeve hole is used to connect to and fix the output end of the motor.

6. The device as claimed in claim 1, wherein the fastening plate of the motor is arranged with at least one mounting hole for being threaded and fastened by at least one fastener; an assembled slot corresponding to the fastening plate of the motor is disposed concavely around the insertion hole on the cover; the fastening plate of the motor is threaded and fixed inside the assembled slot of the cover by the fastener penetrating the mounting hole.

7. The device as claimed in claim 1, wherein a cover plate is disposed over the insertion hole of the cover.

8. The device as claimed in claim 1, wherein a cover is arranged on the other end of the fixed seat and a bearing is disposed between the cover and the winding tube in the fixed seat.

* * * * *